US012637908B1

(12) United States Patent
Davis

(10) Patent No.: US 12,637,908 B1
(45) Date of Patent: May 26, 2026

(54) EXTENSION LADDER BUMPERS WITH ATTACHMENTS

(71) Applicant: Jarran C. Davis, Tulsa, OK (US)

(72) Inventor: Jarran C. Davis, Tulsa, OK (US)

( * ) Notice: Subject to any disclaimer, the term of this patent is extended or adjusted under 35 U.S.C. 154(b) by 525 days.

(21) Appl. No.: 18/092,243

(22) Filed: Dec. 31, 2022

Related U.S. Application Data

(60) Provisional application No. 63/295,594, filed on Dec. 31, 2021.

(51) Int. Cl.
*E06C 7/48* (2006.01)
*E06C 7/14* (2006.01)

(52) U.S. Cl.
CPC . *E06C 7/48* (2013.01); *E06C 7/14* (2013.01)

(58) Field of Classification Search
CPC .................................... E06C 7/48; E06C 7/14
See application file for complete search history.

(56) References Cited

U.S. PATENT DOCUMENTS

| | | | | | |
|---|---|---|---|---|---|
| 4,469,193 | A * | 9/1984 | Rumsey, Jr. | E06C 1/28 | 182/180.1 |
| 4,726,446 | A * | 2/1988 | Perbix | E06C 7/00 | 182/129 |
| 4,974,699 | A * | 12/1990 | Boring | E06C 7/48 | 182/214 |
| 5,358,070 | A * | 10/1994 | Bartnicki | E06C 7/14 | 182/129 |
| 6,334,509 | B1 * | 1/2002 | Ryszkiewicz | B25H 3/00 | 248/210 |
| 6,364,057 | B1 * | 4/2002 | Cornejo | E06C 7/006 | 248/210 |
| 6,945,359 | B2 * | 9/2005 | Logiudice | E06C 7/48 | 182/214 |
| 7,000,731 | B2 * | 2/2006 | Swiderski | E06C 7/46 | 182/108 |
| 9,359,819 | B1 * | 6/2016 | Valadez | E06C 7/14 | |
| 11,486,199 | B2 * | 11/2022 | Mora | E06C 1/12 | |
| 11,834,907 | B2 * | 12/2023 | Mora | E06C 7/482 | |
| 2004/0020582 | A1 * | 2/2004 | Swiderski | E06C 7/46 | 156/92 |
| 2008/0017447 | A1 * | 1/2008 | Sheridan | E06C 1/34 | 182/107 |
| 2014/0083888 | A1 * | 3/2014 | Constable | E06C 7/14 | 206/349 |

* cited by examiner

*Primary Examiner* — Gisele D Ford
(74) *Attorney, Agent, or Firm* — Head, Johnson, Kachigian & Wilkinson, PC

(57) ABSTRACT

The present invention is a bumper which fits over the end of a rail on a straight ladder or the flying section of an extension ladder to protect the surface the ladder is leaned against while also providing a means to hold tools and materials. The bumper is secured in place by an arm extending from the bumper. The arm has a finger which extends into the first rung of the ladder when the bumper is placed on the ladder rail. The bumper may also have a removeable removable accessory for holding power tools, hand tools and/or hardware.

15 Claims, 10 Drawing Sheets

(Inside View)

(Outside View)

EXTENSION LADDER BUMPERS WITH ATTACHMENTS

PRIORITY

The present application claims priority from Provisional Patent Application No. 63/295,594 filed on Dec. 31, 2021 entitled Extension Ladder Bumpers With Attachments which is incorporated herein by reference.

FIELD OF THE INVENTION

The present invention relates generally to an extension ladder bumper. More particularly, the present invention relates to an extension ladder bumper which protects the surface of a building while providing a means to hold tools and materials.

BACKGROUND OF THE INVENTION

Use of an extension ladder or a single piece straight ladder requires the upper ends of the side rails to rest against a building or other structure. These rails are typically made from wood, aluminum, fiberglass or other hard materials. The contact of the ends of these hard siderails can mar or damage the surface on which they are resting. This can greatly add to the amount of work to be done while on the ladder.

The use of bumpers can reduce the amount of damage to the supporting surfaces. These bumpers are made of soft material that cushion and protect the supporting surface. However, these prior art ladder bumpers have merely fit over the upper ends of the side rails. This means they routinely fall of the rails while moving the ladder in place or while storing or transporting the ladder.

Once the ladder is positioned there is often a need for a place to hold tools and hardware while working on the ladder. This could be to hold power tools such as a drill or impact driver, hardware such as nails and screws and buckets of paint or other liquids.

What is needed are ladder bumpers which will hold fast to the ends of a ladder's siderails while placing, moving and storing the ladder. Similarly, there is a need for accessories that can hold a power tool, hand tool, hardware and/or bucket of liquid such as paint.

BRIEF SUMMARY OF THE INVENTION

The present invention is a bumper which fits over the end of a rail on a straight ladder or the flying section of an extension ladder to protect the surface the ladder is leaned against while also providing a means to hold tools and materials. The bumper is secured in place by an arm extending from the bumper. The arm has a finger which extends into the first rung of the ladder when the bumper is placed on the ladder rail. The bumper may also have a removeable removable accessory for holding power tools, hand tools and/or hardware.

BRIEF DESCRIPTION OF THE DRAWINGS

Preferred embodiments of the invention will now be described in further detail. Other features, aspects, and advantages of the present invention will become better understood with regard to the following detailed description, appended claims, and accompanying drawings (which are not to scale) where:

DESCRIPTION OF THE PREFERRED EMBODIMENTS

Figure 1:
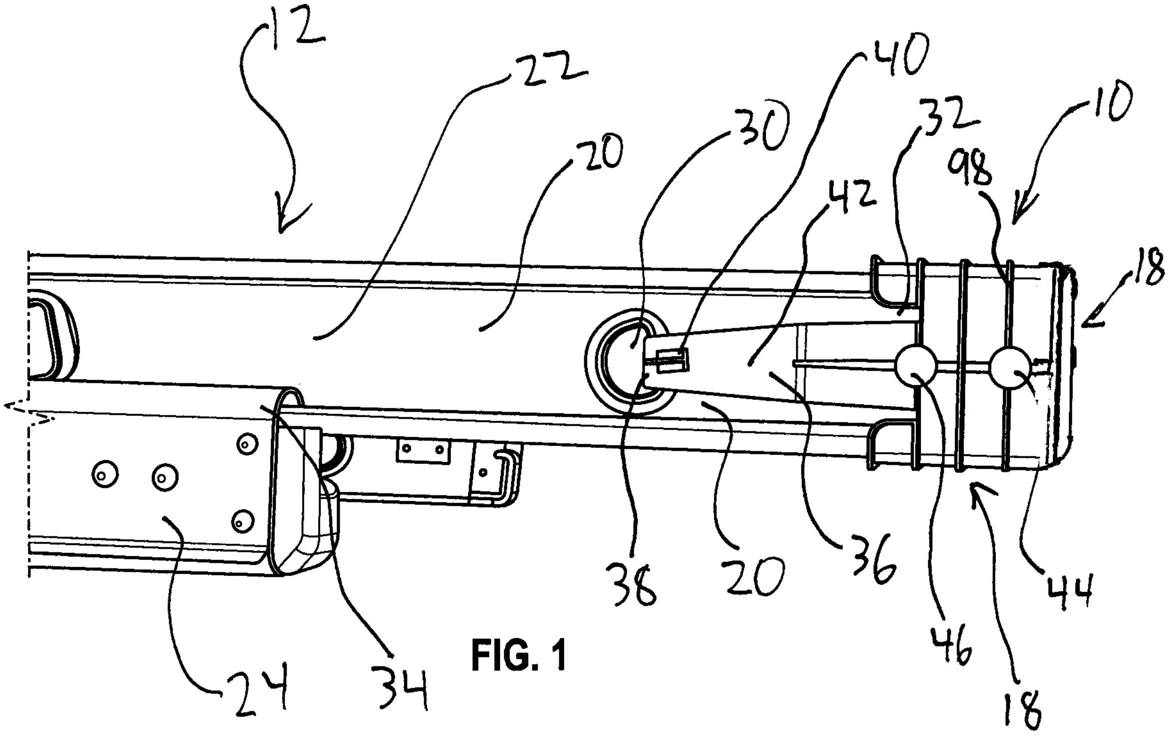
FIG. 1 is a side view of an embodiment of the present invention mounted on the rail of the flying section of an extension ladder with the ladder extended.

The present invention is a bumper 10 which fits over the end of a straight ladder 12 or extension ladder to protect the surface the ladder 12 is leaned against while also providing a means to hold tools and materials. In the preferred embodiment the bumper 10 has a hollow body 14 with an opening 16 on one end. The body 14 and opening 16 are sized to fit over the top end 18 of a ladder rail 20. If used with an extension ladder the bumpers 10 fit over the top end 18 of the rails 20 of the flying section 22, not the base section 24.

In the preferred embodiment the bumpers 10 are constructed of plastic or other soft pliable material. The interior of the hollow body 14 may be contoured to fit the top end 18 of the ladder rails 20.

Figure 2:
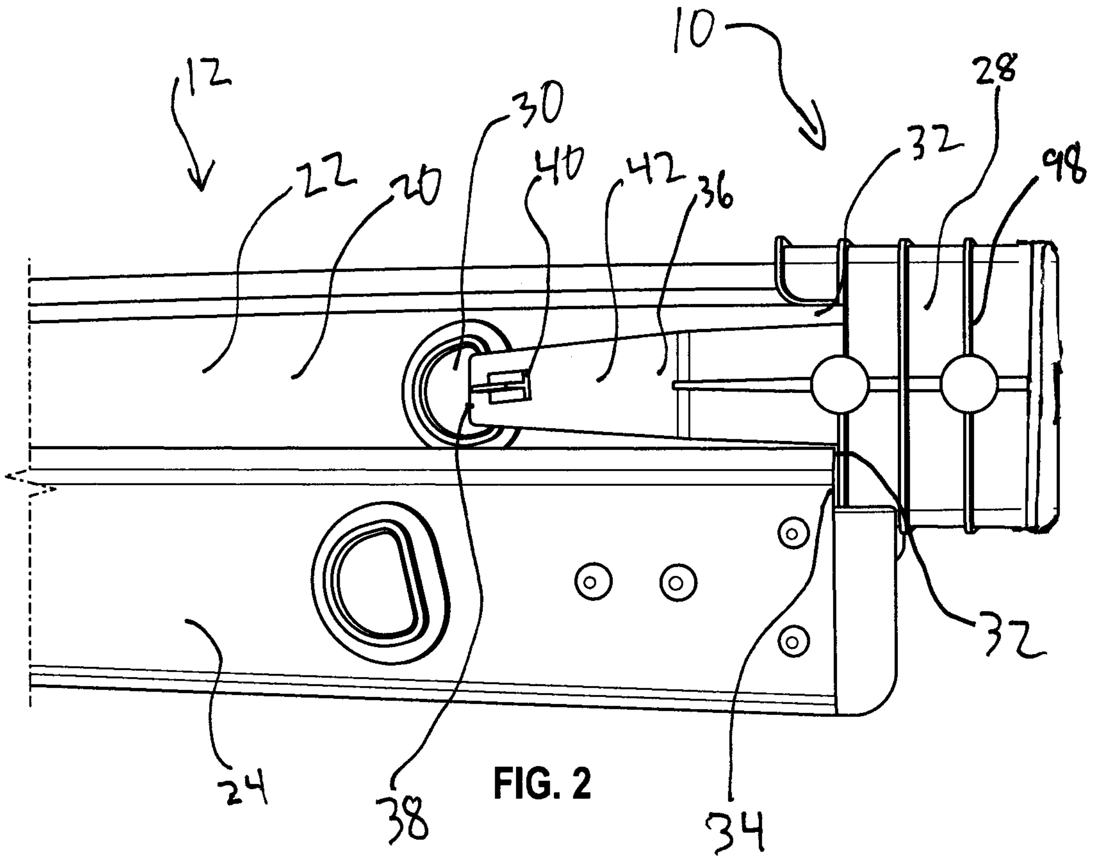
FIG. 2 is a side view of an embodiment of the present invention mounted on the rail of the flying section of an extension ladder with the ladder fully retracted.

Each bumper 10 has an inside face 26 and an outside face 28. The inside face 26 faces the rungs 30 of the ladder 12. The outside face 28 faces away from the rungs 30 of the ladder 12. In the preferred embodiments there are a pair of slots 32 on the outside face 28 which extend from the opening 16 and into the body 14 of the bumper 10. These slots 32 are sized and located to mate with the top 34 of the base 24 of an extension ladder 12. Thus, allowing the fly section 22 of the extension ladder 12 to retract all the way, as seen in FIG. 2.

In the preferred embodiment there is an arm 36 which extends from outside face 28 of the bumper 10 between the slots 32. The arm 36 may be equipped with a finger 38 which extends inward. In the preferred embodiment the length of the arm 36 and the location and size of the finger 38 are such that the finger 38 extends into the top rung 30 of a straight ladder 12 or the fly section 22 of an extension ladder 12. This prevents the bumper 10 from sliding off the end 18 of the rail 20 and maintains the bumper 10 in position. The arm 36 may also be equipped with a hook 40 on its outer surface 42. This can be used to hang a paint bucket or other tools when the bumper 10 is in use on a ladder 12. The hook 40 can also be used as a pull tab to release the finger 38 from the rung 30.

In the preferred embodiment the outside face 28 of each bumper is equipped with a first lug 44 and a second lug 46.

Figure 3:
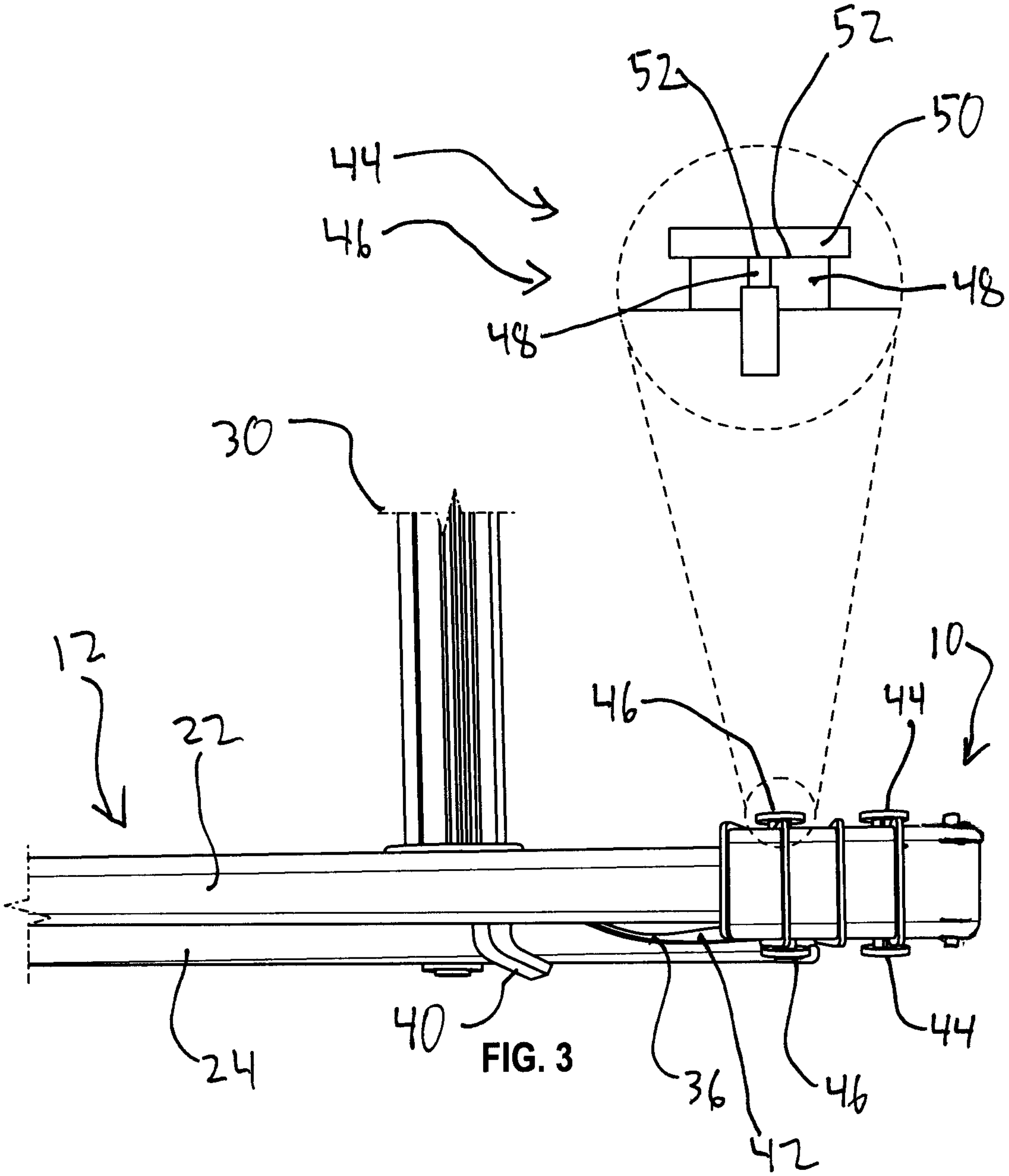
FIG. 3 a side view of an embodiment of the present invention mounted on the rail of the flying section of an extension ladder.
Figure 4:
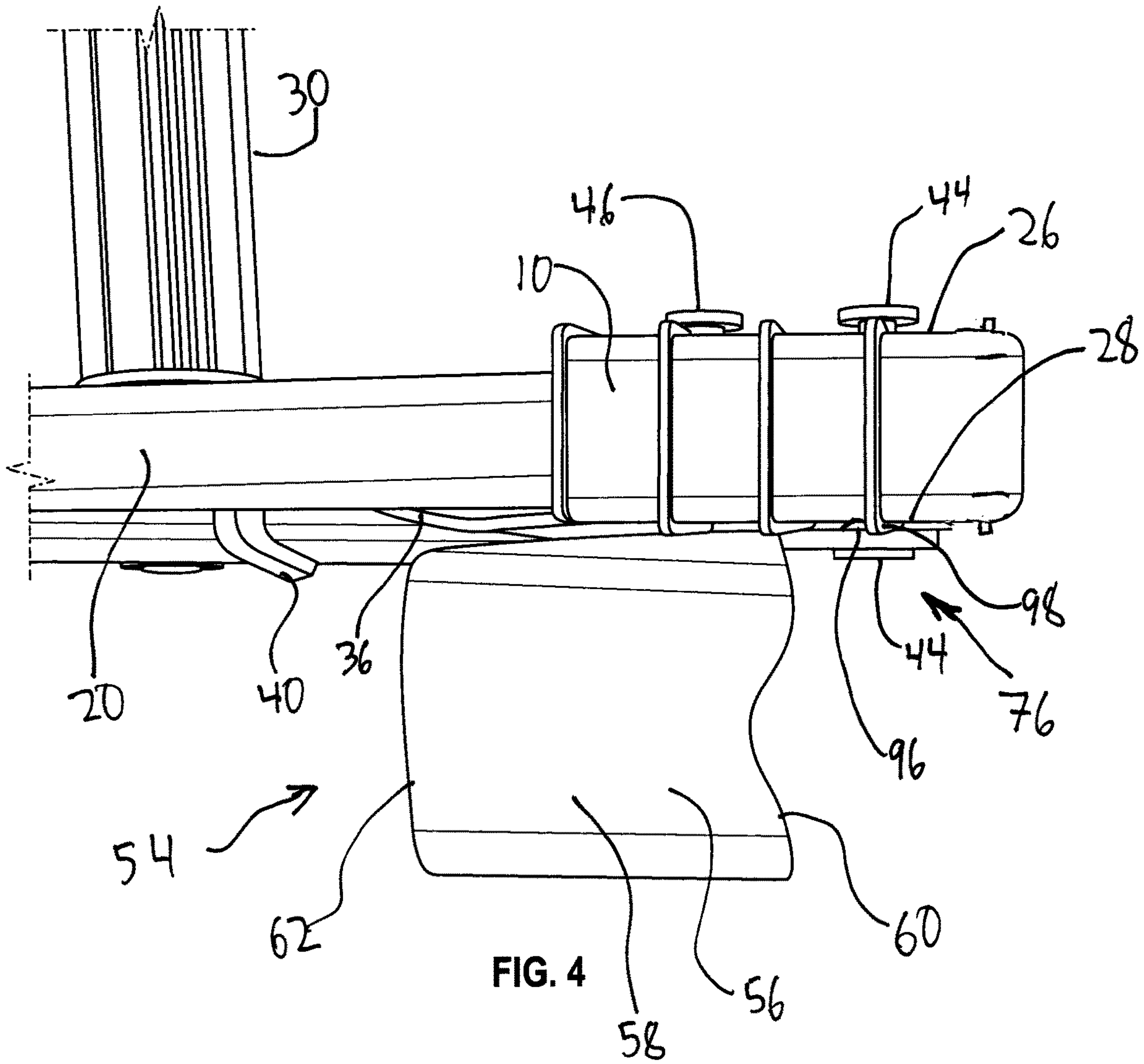
FIG. 4 is a side view of the bumper mounted on a ladder rail with the holster attached.
Figure 5:
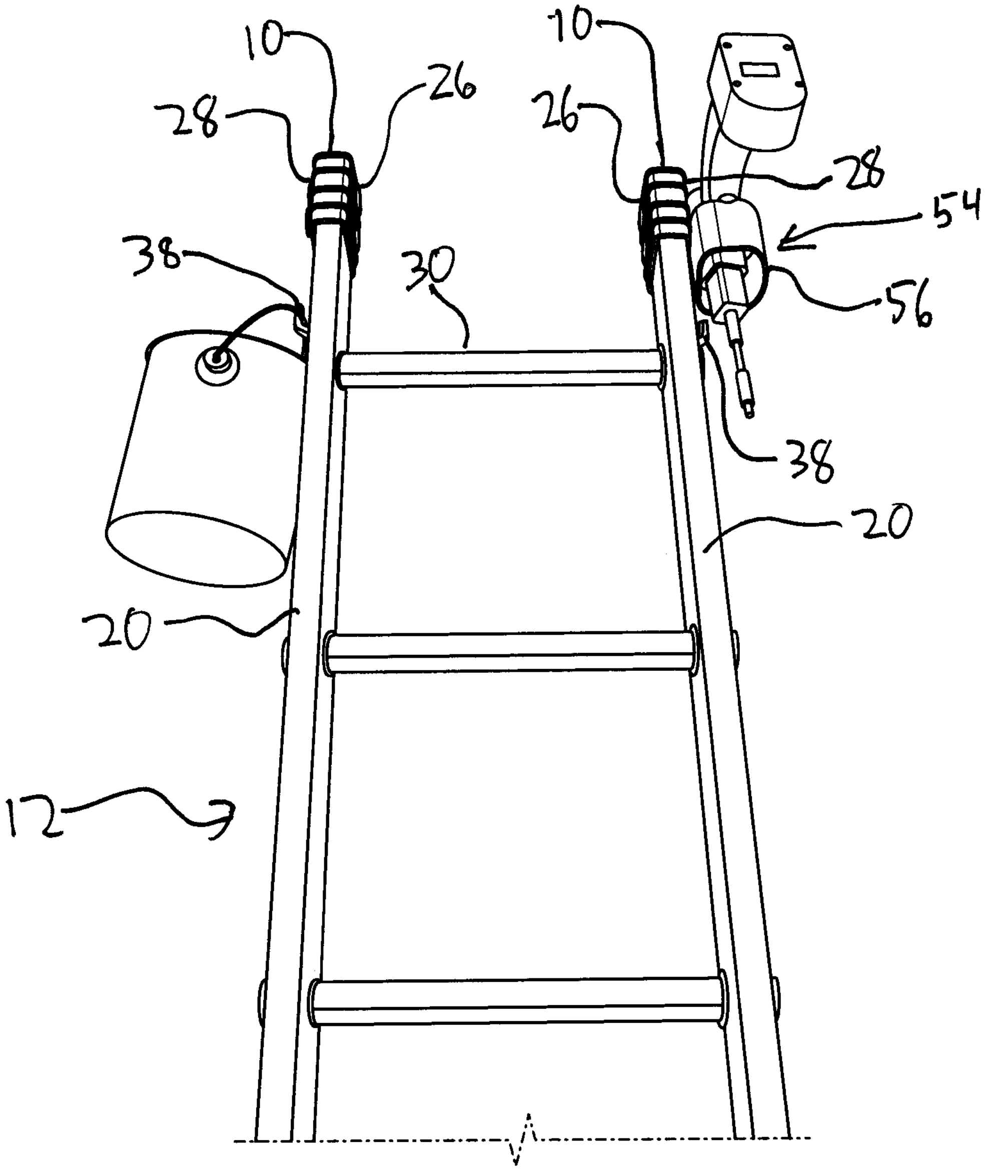
FIG. 5 is a front view of a pair of bumpers mounted on ladder rails holding a bucket of paint on one side and a holster attached to the other bumper with a drill in the holster.
Figure 6:
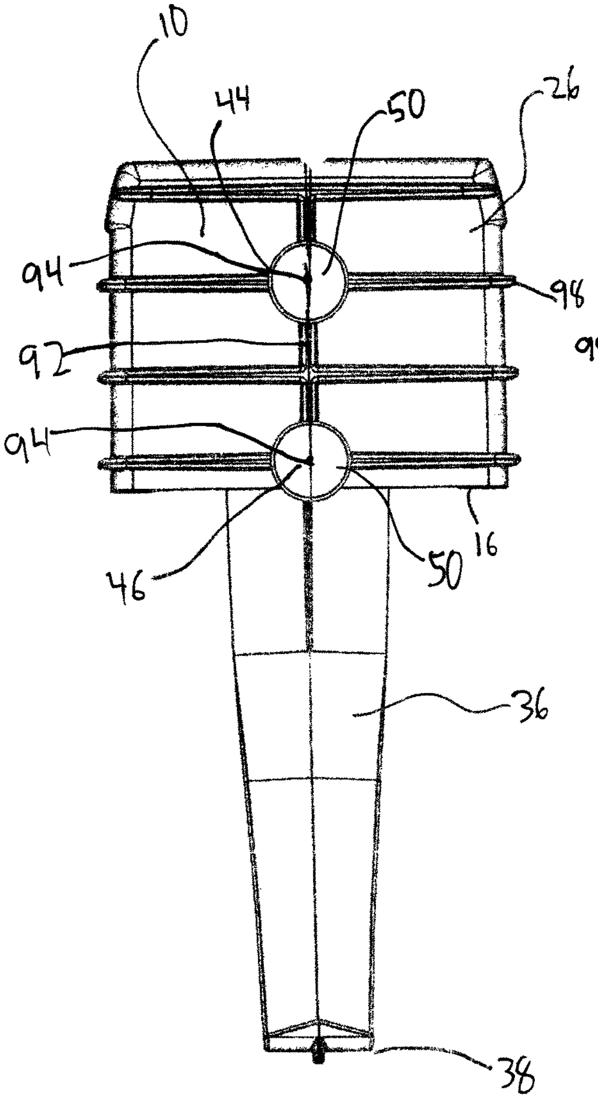
FIG. 6 is a side view of the bumper from the inside surface.
Figure 7:
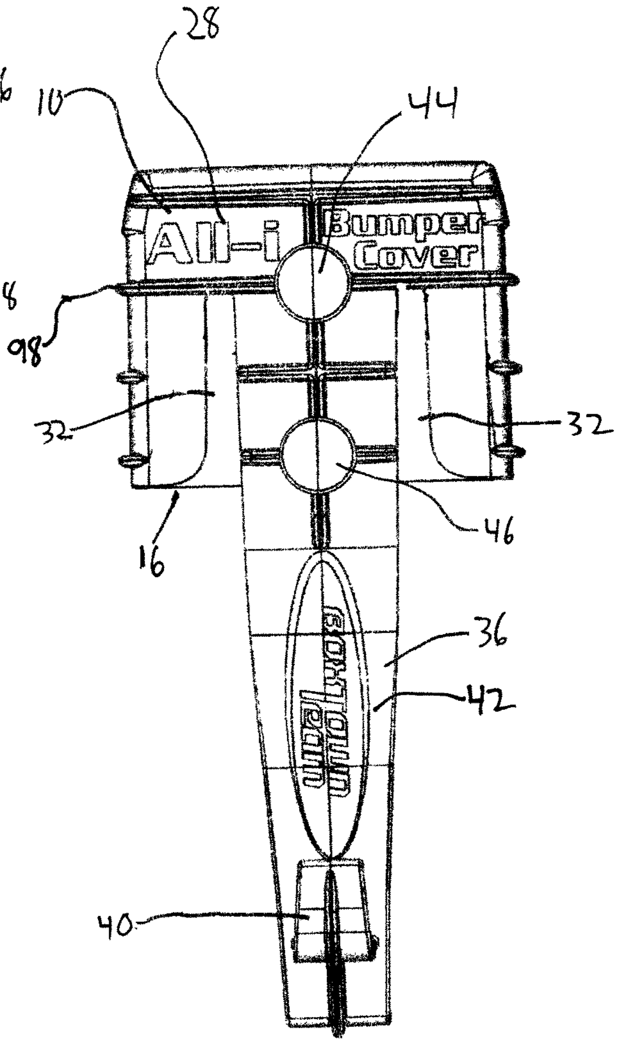
FIG. 7 is a side view of the bumper from the outside surface.
Figure 8:
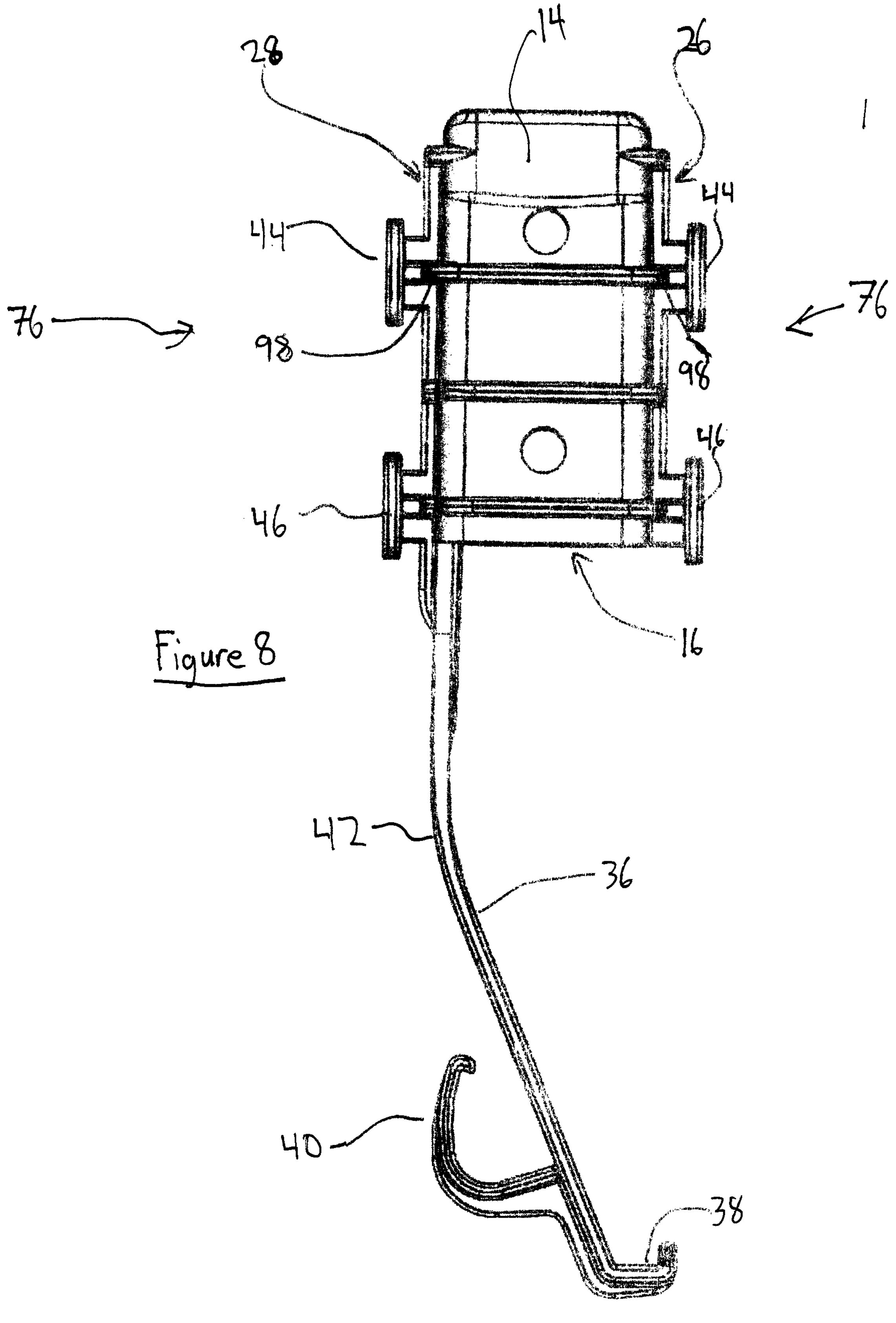
FIG. 8 is a side view of the bumper.
Figure 9:
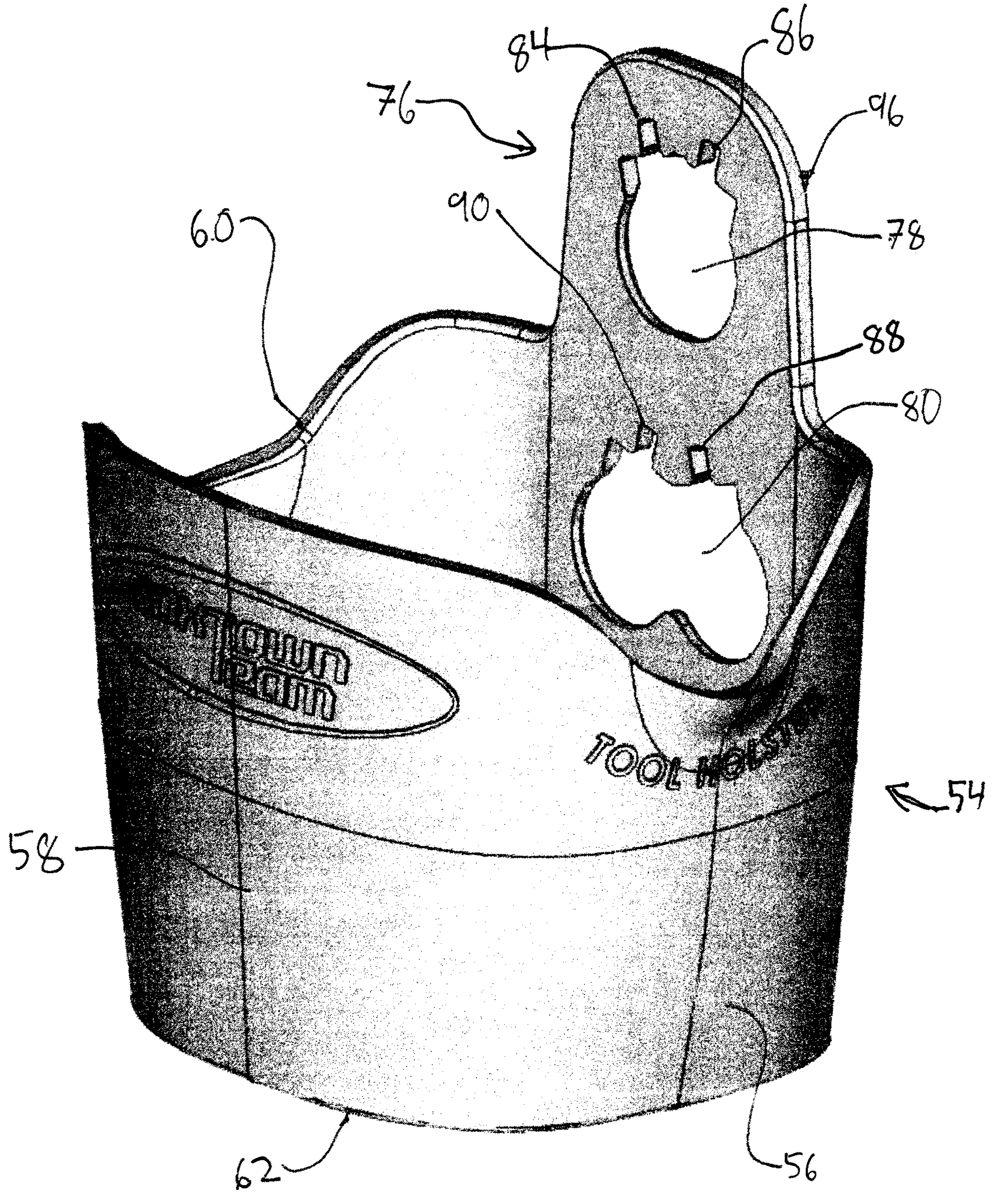
FIG. 9 is a perspective view of one embodiment of the accessories, namely the holster accessory.
Figure 10:
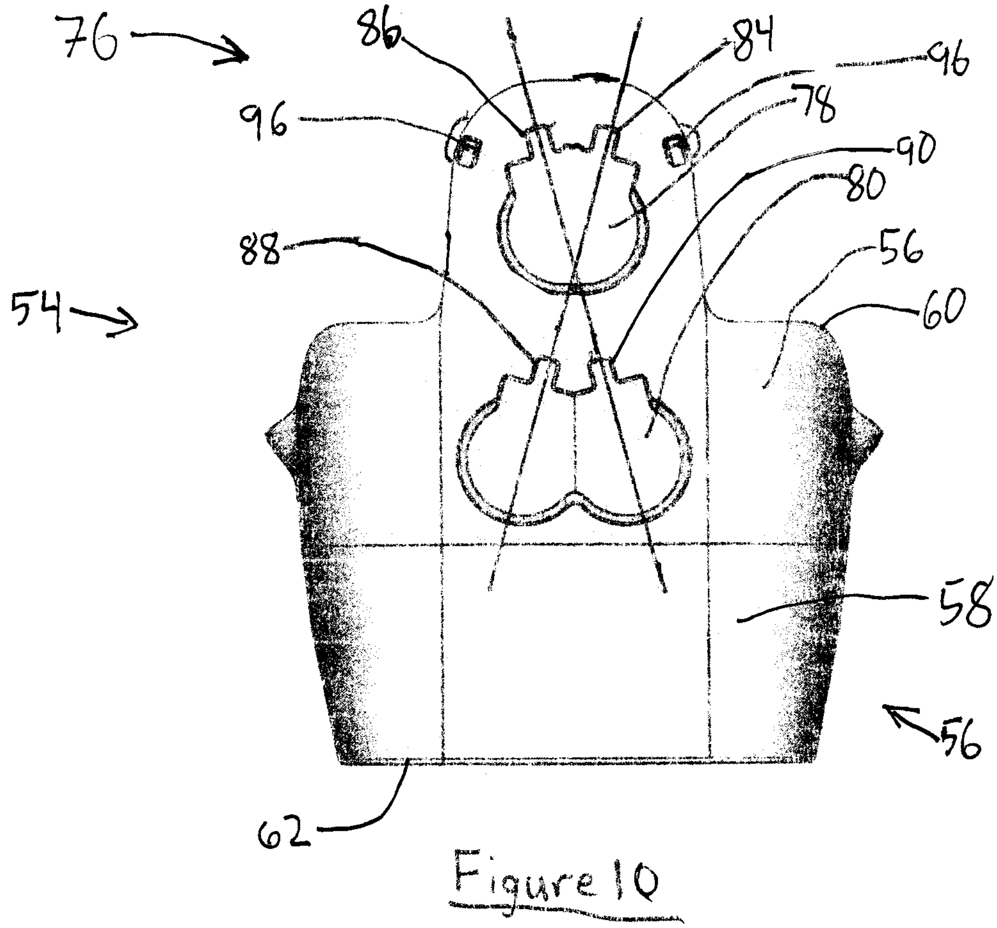
FIG. 10 is a back view of the holster accessory.
Figure 11:
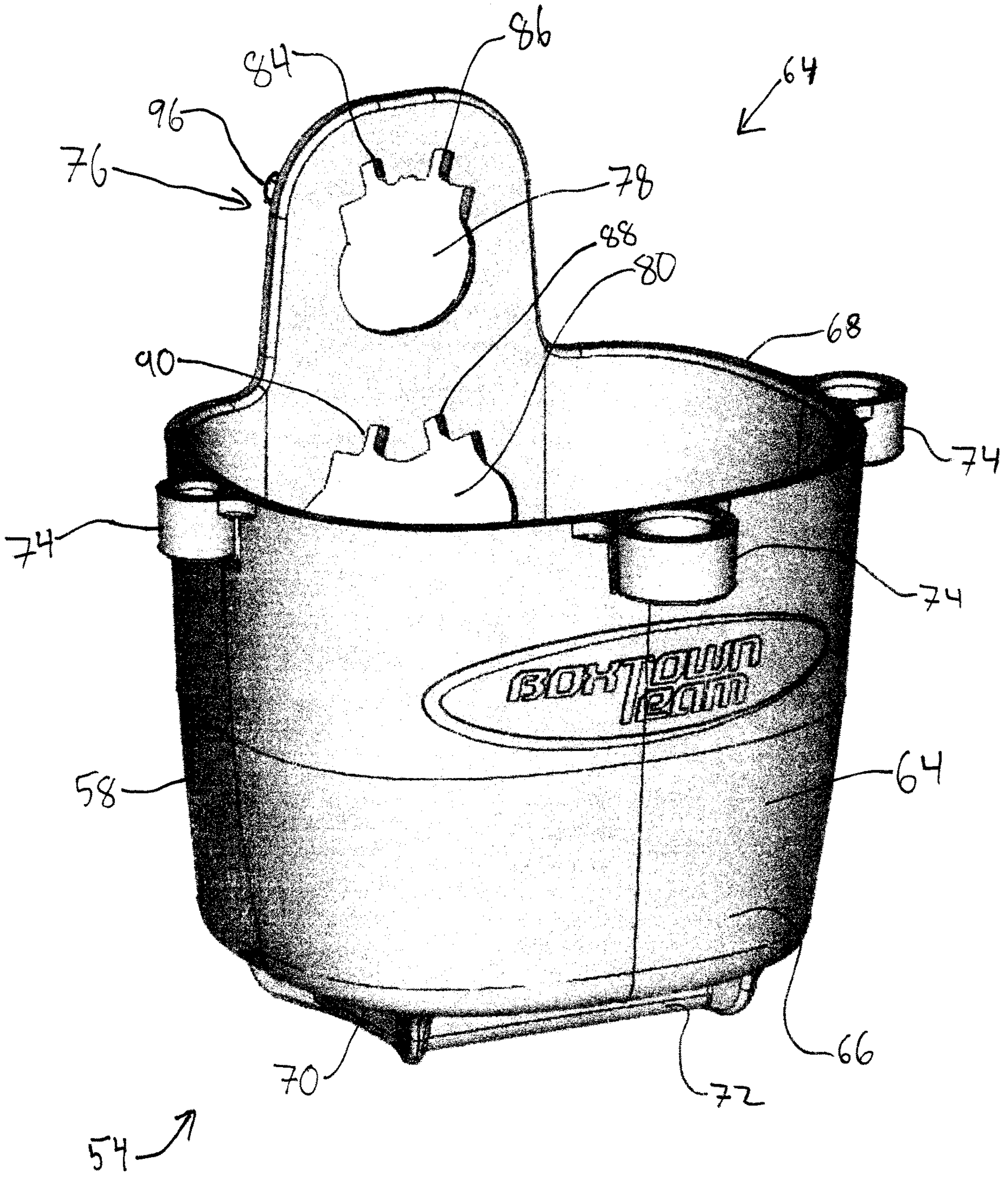
FIG. 11 is a perspective view a second embodiment of the accessories, namely the cup accessory.

Each lug 44 and 46 has a pair of perpendicular flats 48 which extend from the outside surface 28 of the bumper 10. A flat circular head 50 mounts to the distal ends 52 for the flats 48. See FIG. 3. This can be used to mount additional accessories 54. The lugs 44 and 46 may also be located on the inside surface 26 or both inside and outside surfaces. 26 and 28.

One of those accessories 54 is a holster 56. In the preferred embodiment it has a cylindrical shaped body 58 with an open top end 60 and an open bottom end 62. The top end 60 may be larger, smaller or the same size as the bottom end 62. The holster 56 can be used to hold a drill, paint roller, caulk gun or other tools.

Another accessory 54 is the cup 64. It has a hollow body 66 that is open at top 68 and closed at the bottom 70. A magnet 72 may also be located on the bottom 70 of the cup 64 (either inside or outside of the cup 64). This is useful to retain ferrous fastener such as screws and nails as well as other small objects.

The cup 64 may also be equipped with one or more loops 74 near the top 68 of the cup 64. These can be used to hold tools such as a screwdriver.

The accessories 54 have a mounting mechanism 76 comprised of the lugs 44 and 46 on the bumper and a top opening 78 and a bottom opening 80 in the side wall 82 of the accessories. The drawings show the mounting mechanism on two versions of the accessories 54, (the holster 56 and cup 64). However this same mounting mechanism 76 can be adapted for use on any other type accessory. The top opening 78 is roughly circular with a first notch 84 and a second notch 86 extending from the opening 78. The bottom opening 80 is roughly oval or a pair of intersecting circles with a first notch 88 and a second notch 90 extending from the opening 80. The openings 78 and 80 are large enough to fit over the heads 50 of the lugs 44 and 46. The first notch 84 of the top opening 78 is aligned with the first notch 88 of the bottom opening 80. The second notch 86 of the top opening 78 is aligned with the second notch 90 of the bottom opening 80. See FIGS. 19 and 26.

The top and bottom openings 78 and 80 of the mounting mechanism 76 are sized and located to receive the first and second lugs 44 and 46 on the body 14 of the ladder bumper 10. The first notch 84 on the top opening 78 is sized and located to receive one of the flats 48 of the first lug 44 and the first notch 88 on the bottom opening 80 is sized and located to receive one of the flats 48 of the second lug 46 when the lugs 44 and 46 are engaged with the openings 78 and 80. The accessory 54 can also be mounted such that the second notch 86 on the top opening 78 is sized and located to receive one of the flats 48 of the first lug 44 and the second notch 90 on the bottom opening 80 is sized and located to receive one of the flats 48 of the second lug 46 when the lugs 44 and 46 are engaged with the openings 78 and 80.

When the accessory 54 is placed over the lugs 44 and 46, the notches 84, 86, 88 and 90 are engaged with the flats 48 of the lugs 44 and 46, the accessory 54 is tilted slightly relative to a line 92 passing through the center points 94 of the lugs 44 and 46. Further the accessory 54 can be slid downward relative to the lugs 44 and 46. This locks the heads 50 of the lugs 44 and 46 inside the openings 78 and 80 and causes the flats 48 to travel upward into the notches 84, 86, 88 and 90. This prevents rotation of the accessory 54 relative to the bumper 10.

In the preferred embodiment there are also a pair of steps 96, one located on either side of the top opening 80. When the accessory 54 is slid downward these steps 96 interlock with a rib 98 on the side of the bumper 10. This prevents the accessory 54 from moving upward relative to the bumper 10. Thus, the accessory 54 is locked to the bumper 10.

The foregoing description details certain preferred embodiments of the present invention and describes the best mode contemplated. It will be appreciated, however, that changes may be made in the details of construction and the configuration of components without departing from the spirit and scope of the disclosure. Therefore, the description provided herein is to be considered exemplary, rather than limiting, and the true scope of the invention is that defined by the following claims and the full range of equivalency to which each element thereof is entitled.

What is claimed is:

1. A ladder bumper comprising:

a body with an inside face, an outside face, and an open end opening into a hollow interior contoured to fit the top end of a ladder rail, wherein the inside face faces rungs of the ladder and the outside face faces away from the rungs of the ladder when the ladder bumper is placed on the top end of a ladder rail;

a pair of slots on the outside face extending from the opening, the slots sized and located to mate with the top of a base of the ladder when the ladder bumper is placed on the top end of a ladder rail;

an arm extending from the from the outside face of the ladder bumper from between the slots; and a finger extending from the arm towards the inside face of the ladder bumper; wherein the arm and finger are sized so the finger extends into a top rung of the ladder when the ladder bumper is place on the top end of the ladder rail.

2. The ladder bumper of claim 1, further comprising:

a hook extending from the arm away from an outside face of the ladder.

3. The ladder bumper of claim 1, further comprising:

a first lug on the outside face of the ladder bumper, the lug having a head attached to a perpendicular pair of flats extending the outside surface of the ladder bumper.

4. The ladder bumper of claim 3 further comprising:

a second lug located just below the first lug.

5. The ladder bumper of claim 1, further comprising:

a first lug on the inside face of the ladder bumper, the lug having a perpendicular pair of flats extending from the inside face of the ladder bumper.

6. The ladder bumper of claim 5 further comprising:

a second lug located just below the first lug.

7. A ladder bumper comprising: a body with an inside face, an outside face, and an open end opening into a hollow interior contoured to fit the top end of a ladder rail, wherein the inside face faces rungs of the ladder and the outside face faces away from the rungs of the ladder when the ladder bumper is placed on the top end of a ladder rail;

a pair of slots on the outside face extending from the opening, the slots sized and located to mate with the top of a base of the ladder when the ladder bumper is placed on the top end of a ladder rail;

a first lug on the outside face of the ladder bumper, the lug having a head attached to a perpendicular pair of flats extending from the inside face of the ladder bumper;

a second lug located just below the first lug;

an accessory with a mounting mechanism having a top and a bottom opening in a side wall;

the top opening having a first notch extending from the opening; and the bottom opening having a first notch extending from the opening;

wherein the first notch of the top opening is aligned with the first notch of the bottom opening.

8. The mounting mechanism of claim 7 further comprising:

the top opening having a second notch extending from the opening;

the bottom opening having a second notch extending from the opening;

wherein the second notch of the top opening is aligned with the second notch of the bottom opening.

9. The mounting mechanism of claim 8 further comprising:

the top and bottom openings are sized and located to receive the first and second lugs.

10. The mounting mechanism of claim 7 further comprising:

the first notch of the top opening is sized and located to receive one of the flats on the first lug; and the first notch of the bottom opening is sized and located to receive one of the flats of the second lug.

11. The mounting mechanism of claim 8 further comprising:

the second notch of the top opening is sized and located to receive one of the flats on the first lug; and the second notch of the bottom opening is sized and located to receive one of the flats of the second lug.

12. The accessory of claim 7 further comprising:

a holster having a cylindrical shaped body with an open top end and an open bottom end.

13. The accessory of claim 7 further comprising:

a cup having a hollow body with an open top end and a closed bottom end.

14. The cup of claim 13 further comprising:

a magnet located on the bottom of the cup.

15. The cup of claim 13 further comprising:

a loop located on along the open top end.

* * * * *